July 29, 1952            J. A. KARNS            2,604,660
MOLD AND METHOD FOR FORMING GRIPS FOR GOLF CLUBS AND THE LIKE
Filed June 23, 1948
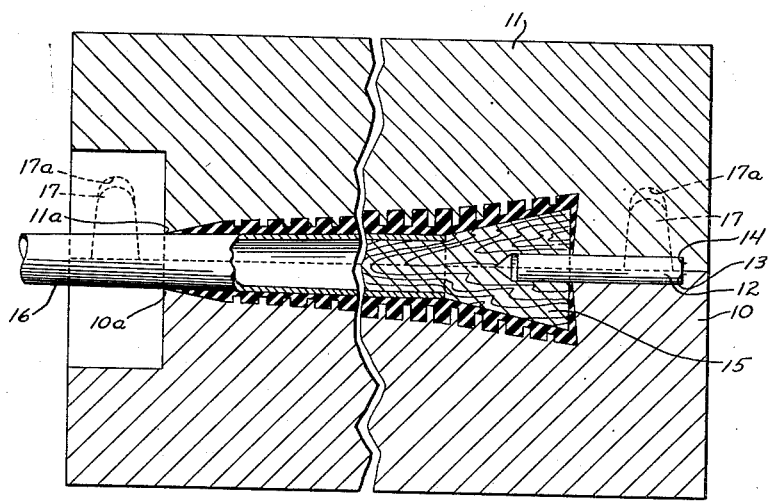
INVENTOR.
JAMES A. KARNS
BY
Willard D. Eakin
ATTORNEY Patented July 29, 1952

2,604,660

UNITED STATES PATENT OFFICE 2,604,660

MOLD AND METHOD FOR FORMING GRIPS FOR GOLF CLUBS AND THE LIKE

James A. Karns, Akron, Ohio, assignor to Fawick Flexi-Grip Company, Akron, Ohio, a corporation of Ohio Application June 23, 1948, Serial No. 34,634

2 Claims. (Cl. 18—36)

This invention relates to molds for shaping and vulcanizing thermosetting materials, and, more particularly, is concerned with molds for vulcanizing rubber and rubber-like materials to golf club shafts, and the like.

Various molds have been proposed heretofore for use in vulcanizing thermosetting materials, including molds for vulcanizing rubber golf club grips. The very large percentage of molds for curing golf grips are of the type in which the grip is cured as a separate rubber part which is, after vulcanization, secured to the golf club shaft by sliding the grip over the end of the shaft and securing it in place with cement. This operation of molding the grip as a separate piece and thereafter slipping it over and securing it to a golf club shaft is relatively expensive and time consuming. Some efforts have been made heretofore to vulcanize a grip directly to a golf club shaft or the like, but such efforts have never met with commercial success, so far as I am aware, and the usual golf club grip is still made up of a wrapped paper base and a wrapped cover strip of leather, usually terminating at the grip end of the shaft in a metal or other cap fastened to a wooden plug driven into the end of the hollow metal shaft. A grip of this leather-paper type is naturally laborious to construct and is relatively expensive, and often comes displaced in use.

Moreover, in those few suggested practices of vulcanizing a rubber-like grip to a golf or similar shaft, as for example, shown in Brisick Patent No. 2,103,889, a fully molded rubber grip is not provided which covers the complete end of the shaft, and it has always been considered necessary to utilize a metal or other cap, following the practice of the conventional paper and leather grip.

It is the general object of my invention to avoid and overcome the foregoing and other difficulties of and objections to known mold structures and molding practices by the provision of an improved mold which will directly vulcanize a grip on a golf club shaft or the like, the grip having an end wall overlying the upper end of the shaft of the club, and with the grip being properly centered at all times in the mold.

Another object of my invention is the provision of improved mold of the character described and adapted to position and support a golf club shaft or the like in properly centered manner.

The single figure of the drawing is a longitudinal vertical section of a mold embodying my invention in one of its preferred forms as applied to the mold-vulcanizing of a hand grip upon the shaft of a golf club, the work being shown in place in the mold.

An advantage of the invention is that the entire mold, including the shaft-centering means, can consist of as few as three parts, which, as here shown, are a lower mold section 10, an upper mold section 11 mating with it, and a centering pin 12 fitting in complemental recesses formed in the two and having its outer end abutting shoulders 13, 14 which are the outer end walls of the recesses.

The inner end portion of the centering pin 12 projects into the molding cavity and is adapted to be removably fitted in a central hole formed in the shaft, the shaft as here shown being inclusive of a wooden plug 15 press-fitted in the end of a metal tube 16 which is the main part of the shaft.

When the shaft, the centering pin 12 stuck in its end, and the moldable stock wrapped or otherwise well distributed upon at least chiefly the side faces of the shaft, are placed in the cavity of the lower mold section, the centering pin enters part way into its recess in the lower mold section, and likewise it enters part way into its recess in the upper mold section when the latter is placed upon the lower section and begins to be pressed downward in the mold-closing operation. As the stock extending itself on the end face of the shaft does not reach the pin in quantity or with great pressure until the mold is almost fully closed, very little if any of the stock is extruded into the spaces between the centering pin and the walls of its recesses, in consequence of which the pin has a desirable completeness and uniformity of seating in those recesses as the mold is fully closed, which is to say that it, and, with it, the adjacent end of the shaft, are given, by the closing of the mold, substantially perfect centering with relation to the finished, fully molded grip, in spite of the pin having no clamping means other than the two mold sections, and being adapted to be preliminarily stuck into the shaft and then introduced to the mold sections as if it were a part of the thing to be molded.

Centering of the shaft at the other end of the mold cavity is provided by terminal edges 10a, 11a of the mold sections which preferably are of such short dimension lengthwise of the shaft, beyond the end of the molding cavity proper, that they will so displace stock, under the force of the mold-closing pressure, as to contact, or approximately contact, the shaft, thus perfectly centering the shaft and also permitting so little flash or mold fin that the latter can be simply torn from the finished grip.

Thus, at each end of the mold cavity, extrusion of stock into space between metal members, and gripping of stock between them, is either avoided completely or so minimized that almost perfect centering of the shaft in the finished grip is provided.

Preferably the mold walls $10^b$ and $11^b$ which define the outer end of the molding cavity are so dished as shown, or otherwise shaped in relation to the work, that the stock becomes thinner and thus encounters increased resistance to its extending itself, as it approaches the centering pin.

The dotted lines 17, 17 and $17^a$, $17^a$ in the figure represent the usual mold dowels and their holes.

After the mold-vulcanizing operation is completed the work is removed from the mold, permissibly with the centering pin still in place in the end of the shaft, and after removal of the pin the hole formed by it in the end wall of the grip can be filled or covered in any suitable manner.

Modifications are possible within the scope of the invention as defined in the appended claims.

I claim:

1. Apparatus for the compression molding of a covering upon an end portion only of a substantially straight shaft member having a recess in its end face, said apparatus comprising molding members and a shaft-positioning member which, with the shaft, when the mold is fully closed, define a completely enclosed chamber having only the size and shape of the cover, and constitute the only stock-contacting and deforming members of the assembly, the cover, and accordingly the said chamber, having a part overlying the end face of the shaft, said mold members having stock-confining margins at one end of the cavity shaped to fit the said shaft member and at the other end of the cavity having on their meeting faces recess walls shaped to fit side surface areas of said shaft-positioning member, as the mold is brought to fully closed condition, for correcting any displacement of the shaft's end-portion by unequal pressures of the stock on opposite sides of it and thus accurately positioning the shaft's end portion in the cover, and said shaft-positioning member being shaped at its inner end to fit within the said recess in the end face of the shaft member, so that a part of the end face of the shaft, surrounding the shaft-positioning member, is exposed to the stock being molded, the said shaft member and the said shaft-positioning member being separable.

2. The method of compression-molding a covering upon an end portion only of a substantially straight shaft member having a recess in its end face which comprises temporarily mounting a shaft-positioning member with only an end portion of it in the said recess, positioning the shaft member by engagement of closing mold elements with it and with the said shaft-positioning member only, while compacting a body of moldable material directly against the end portion only of the shaft member by contact of closing mold elements with all of the outer surface of the said body and thereby shaping all of the said body as the final covering of the shaft, the said body being adhered directly to the said shaft member in the compacting operation, and thereafter removing the said shaft-positioning member from said recess.

JAMES A. KARNS.

REFERENCES CITED

The following references are of record in the file of this patent:

UNITED STATES PATENTS

| Number | Name | Date |
|---|---|---|
| 333,469 | Kipper | Dec. 29, 1885 |
| 1,638,002 | Lynn | Aug. 2, 1927 |
| 1,692,340 | Lattin | Nov. 20, 1928 |
| 2,324,978 | Lohrand et al. | July 20, 1943 |
| 2,354,241 | Anderson | July 25, 1944 |
| 2,501,863 | Cox | Mar. 28, 1950 |